3,425,309
HEADS OF DRUMS, BANJOS, TYMPANI AND THE
LIKE MUSICAL INSTRUMENTS
Abraham Isidore Elzas and Abraham Samuel Elzas, both
of Maynooth Road, Celbridge, Ireland
No Drawing. Filed Feb. 18, 1964, Ser. No. 345,595
Claims priority, application Ireland, Feb. 26, 1963,
162/63
U.S. Cl. 84—414                  7 Claims
Int. Cl. G10d 13/02

ABSTRACT OF THE DISCLOSURE

A drum head comprising a fabric woven from polyester fibre yarn.

---

This invention relates to the heads of drums, banjos, tympani, and the like musical instruments (hereinafter referred to collectively as drum heads), the invention being also concerned with the application and treatment of the drum heads.

It is well known that conventional skins and plastic and nylon materials as used at present for drum heads suffer from the major disadvantage that they do not have an all around suitability under all climatic conditions or adaptibility for use as drum heads on varying type drums. For example, conventional skins of calf when used with military drums, are often exposed to rain and dampness and it has been found that under such conditions the skins tend to stretch in damp weather and to become soft in very wet weather with a resultant poor performance from the instrument. The use of plastic material on military drums overcomes to a large extent the dangers of exposure to dampness or rain experienced with conventional skins, as plastic material is in general water repellent. However, it has been found that stick slide, by which is meant the undesirable sliding of the drum stick across the material, is more prevalent in wet weather with a plastic drum head than with any other alternative type of drum head. Additionally plastic material has been shown to be insufficiently tough for satisfactory use with military drums, in so far as the material if beaten with drum sticks for any length of time, will exhibit a number of dents. Alternatively nylon material exhibits a tendency to stretch a great deal, and consequently continuous retensioning of the drum head is required in order to ensure that the tone of the drum is kept at the correct pitch. The consequence of the frequent retensioning required is generally that resultant life of the drum head is short.

It is the object of the present invention to overcome these difficulties by providing a drum head consisting of a fabric woven from polyester fibre yarn which is mounted and tensioned on a flesh hoop. Preferably the fabric is treated prior to mounting on the flesh hoop and again after mounting and tensioning thereon.

In carrying out the invention a sheet of fabric woven from a polyester fibre yarn, i.e. fibres of a condensation product of dimethyl terephthalate and ethylene glycol sold under the trademarks Dacron and Terylene, is firstly pretensioned and/or stabilized and/or heat sealed under pressure to enhance the dimensional stability of the fabric. The stabilized fabric is then subjected to a deep-set silica treatment which ensures that the silica treated stabilized fabric will possess high water-repellent properties. It will, of course, be appreciated that prior to the weaving of the fabrics, the yarn itself may be pretensioned to enhance its dimensional stability.

A suitably sized portion of the sheet of fabric is then mounted on a flesh hoop and is, in conventional manner, tensioned sufficiently to ensure stretching of the fabric on the hoop to form the actual drum head.

The drum head is then sprayed while tensioned on the hoop on one or both sides thereof with a resin composition containing an additive, for example silica flour, and a thinner. Following the spraying operation the drum head is left for some time to allow the skin to harden under the action of the resin composition.

In addition to hardening the head and making the surface thereof more durable and dent-resistant the resin composition additionally fills in any pores which may have been formed in the head during the tensioning thereof on the hoop, and makes the head abrasion-resistant, resulting in better wearing qualities and minimising stick slide.

It has been found that the treatment of the fabric with the resin composition results in the drum head having a better performance tone.

It should be understood that while the untreated fabric is of itself suitable for use as a head for a drum, the various treatments for the fabric previously mentioned are each desirable to give the fabric a higher degree of suitability and adaptibility in all climatic conditions. No one treatment is essential in order that the fabric be used as a head for a drum, and all or any one of the fabric or yarn treatments may be omitted if the properties imparted to the fabric or yarn thereby are not required in the case of any particular drum head being prepared.

We claim:

1. A head for a drum, banjo, tympany, or the like musical instrument, which comprises a fabric woven from polyester fibre yarn, the polyester being a condensation product of dimethyl terephthalate and ethylene glycol.

2. A head as claimed in claim 1, in which the fabric is pretensioned.

3. A head as claimed in claim 1, in which the fabric is dimensionally stabilized.

4. A head as claimed in claim 1, in which the fabric is heat-sealed under pressure.

5. A head as claimed in claim 1, in which the fabric is woven from polyester fibre yarn which is pretensioned prior to weaving.

6. A head as claimed in claim 1, in which the fabric carries a water-repellent deep-set silica coating.

7. A head as claimed in claim 1, further comprising a flesh hoop on which the fabric is mounted and tensioned, and a resin composition on the tensioned fabric to harden the same.

References Cited

UNITED STATES PATENTS

| | | | |
|---|---|---|---|
| 2,641,592 | 6/1953 | Hofrichter | 84—414 |
| 2,667,098 | 1/1954 | McMullen | 84—414 |
| 2,830,484 | 4/1958 | Erwin | 84—414 |
| 2,934,989 | 5/1960 | Belli et al. | 84—414 |

FOREIGN PATENTS

| | | |
|---|---|---|
| 852,364 | 10/1960 | Great Britain. |
| 870,046 | 6/1961 | Great Britain. |

RICHARD B. WILKINSON, *Primary Examiner.*

L. R. FRANKLIN, *Assistant Examiner.*

U.S. Cl. X.R.

84—452